United States Patent
Gopalan et al.

(10) Patent No.: US 6,492,051 B1
(45) Date of Patent: Dec. 10, 2002

(54) HIGH POWER DENSITY SOLID OXIDE FUEL CELLS HAVING IMPROVED ELECTRODE-ELECTROLYTE INTERFACE MODIFICATIONS

(75) Inventors: Srikanth Gopalan, Monroeville, PA (US); Norman F. Bessette, North Huntingdon, PA (US); George R. Folser, Lower Burrell, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 147 days.

(21) Appl. No.: 09/654,531

(22) Filed: Sep. 1, 2000

(51) Int. Cl.[7] ................................................. H01M 8/12
(52) U.S. Cl. ........................................... 429/31; 429/41
(58) Field of Search ................................ 429/31, 33, 41

(56) References Cited

U.S. PATENT DOCUMENTS

| | | |
|---|---|---|
| 3,823,302 A | 7/1974 | Muehlberger |
| 3,839,618 A | 10/1974 | Muehlberger |
| 4,049,841 A | 9/1977 | Coker et al. |
| 4,490,444 A | 12/1984 | Isenberg |
| 4,562,124 A | 12/1985 | Ruka |
| 4,874,678 A | 10/1989 | Reichner |
| 4,888,254 A | 12/1989 | Reichner |
| 5,085,742 A | 2/1992 | Dollard et al. |
| 5,106,706 A | 4/1992 | Singh et al. |
| 5,516,597 A | 5/1996 | Singh et al. |
| 5,543,239 A | 8/1996 | Virkar et al. |
| 5,629,103 A | 5/1997 | Wersing et al. |
| 5,686,198 A | 11/1997 | Kuo et al. |
| 5,993,989 A | 11/1999 | Baozhen et al. |
| 6,287,716 B1 * | 9/2001 | Hashimoto et al. ........... 429/33 |

FOREIGN PATENT DOCUMENTS

DE 19836132 * 2/2000

* cited by examiner

Primary Examiner—Patrick Ryan
Assistant Examiner—Jonathan Crepeau

(57) ABSTRACT

A tubular fuel cell (10) contains an air electrode (24), an electrolyte (20), and a fuel electrode (12) where an interlayer material (22) is disposed between the air electrode and the electrolyte, the interlayer (22) containing a two-phase particle mixture, where the particles have a size range from 0.5–5 micrometers, but where at least 50 wt % of the particles are less than 3 micrometers and where the interlayer (22) is from 15–40 micrometers thick and from 5–50% porous.

9 Claims, 3 Drawing Sheets

HIGH POWER DENSITY SOLID OXIDE FUEL CELLS HAVING IMPROVED ELECTRODE-ELECTROLYTE INTERFACE MODIFICATIONS

BACKGROUND OF THE INVENTION

1. Field of the Invention

This invention relates generally to solid oxide fuel cells (SOFCs) which contain an electrolyte between two electrodes and a new and improved interlayer material used between one of the electrodes and the electrolyte.

2. Background Information

High temperature, solid electrolyte, electrochemical generators employing interconnected electrochemical fuel cells convert chemical energy into direct current electrical energy at temperatures of about 800° C. to 1200° C. Such solid electrolyte fuel cells and multi-cell generators are well known; their fuel electrodes, air electrodes, solid oxide electrolytes and interconnection configurations are taught in U.S. Pat. No. 4,490,444 (Isenberg). Each electrochemical fuel cell typically includes a self-supporting porous air electrode or cathode made of, for example, doped lanthanum manganite ($LaMnO_3$). A dense, gas-tight, solid electrolyte is deposited on, and surrounds, the outer periphery of the air electrode. The electrolyte is made of, for example, yttria stabilized zirconia (YSZ)—of the formula $(ZrO_2)_{0.9}(Y_2O_3)_{0.1}$—about 0.001 mm to 0.1 mm thick. A porous fuel electrode or anode is deposited on, and substantially surrounds, the outer periphery of the solid electrolyte and is made of nickel-zirconia cermet about 0.1 mm thick. Both the solid electrolyte and the fuel electrode are discontinuous to allow for inclusion of an interconnect on the air electrode, so as to provide means to electrically connect adjacent electrochemical fuel cells. A dense, gas-tight interconnect is deposited on a selected radial segment of the air electrode, at the portion that is discontinuous in the electrolyte and fuel electrode, and is made of calcium, strontium, or magnesium doped lanthanum chromite ($LaCrO_3$).

In the past, protective interlayer materials have been suggested for a variety of reasons. In U.S. Pat. No. 5,516,597 (Singh et al.), a niobium and or tantalum doped $CeO_2$ was suggested between the interconnect and the air electrode as a protective layer, to prevent interconnect degradation during long term electrochemical operations. Singh et al., in U.S. Pat. No. 5,106,706, recognized problems of oxygen loss from air electrode particles in contact with the solid electrolyte and the need to increase the active area for electron exchange reactions with oxygen at the electrode-electrolyte interface, suggesting a porous discontinuous interlayer of at least one of single-phase cerium oxide or praseodymium oxide. These oxides were in the form of particles having diameters from 0.01 micrometer to 0.1 micrometer and were disposed between the electrolyte and air electrode to prevent intrusion of electrolyte into the porous air electrode surface and provide abundant nucleation sites for electrolyte formation.

Li Baozhen et al., in U.S. Pat. No. 5,993,989, also recognized problems of interaction between the lanthanum oxide-based air electrode and the zirconia-based electrolyte to form poorly conducting compounds increasing cell resistance and air electrode polarization. There, use of ceria as an interface material was felt to provide substantial thermal expansion mismatch, and a terbia/yttria stabilized zirconia was suggested as an alternate interface material. A $Sc_2O_3$-stabilized zirconia electrolyte was also suggested. In most cases in these previous patents the preferred air electrode composition was a Ca and Ce doped $LaMnO_3$ as taught by U.S. Pat. Nos. 4,562,124 and 5,686,198 (Ruka and Kuo et al., respectively).

Virkar et al., in U.S. Pat. No. 5,543,239, concerned with the need for an enhanced charge transfer at the three-phase boundary of electrode/electrolyte/gas phase in electrochemical devices, suggested an electrode configuration having a solid electrolyte center, such as YSZ, covered on both sides with a porous surface layer of dense electrolyte material such as either YSZ or $Bi_2O_3$ interdispersed with an electrocatalyst. The suggested electrocatalysts included: silver; platinum; palladium; rhodium; iridium; ruthenium; ($La_{1-x}Sr_x$) $MnO_3$ where x is 0–0.5; ($La_{1-x}Sr_x$) $CoO_3$, wherein x is 0 to 0.6; ($La_{1-x}Sr_x$) ($Co_{1-y}Fe_y$)$O_3$, wherein x is 0 to 0.4 and y is 0 to 0.8; $In_2O_3$—$PrO_{1.83}$—$ZrO_2$, having composition ratios of $In_2O_3$ of 0–90%, $PrO_{1.83}$ of 10–60% and $ZrO_2$ of 0 to 50%; $TbO_2$ being 35 to 40% doped YSZ; $SnO_2$ being 0 to 20% doped with $In_2O_3$; $ZrO_2$ being 0 to 40% doped with $In_2O_3$; $Sm_{0.5}$ $Sr_{0.5}$ $CoO_3$; $La_{0.6}Ca_{0.4}MnO_3$; $Y_{1-x}Ca_xFeO_3$, wherein x is 0 to 1; $SrCo_{1-x}FeO_3$, wherein x is 0.2 to 0.8; and $TiO_2$ being 0 to 30% doped with YSZ.

In U.S. Pat. No. 5,629,103 (Wersing et al.), electrochemically active interface layers were applied between solid oxide electrolyte and both the cermet anode and the air electrode cathode in a fuel cell, to improve bonding and interface surface area. The interlayer next to the cermet anode was a doped zirconium or cerium oxide, with a 1 micrometer to 3 micrometer thick interlayer of ionically and electronically conducting air electrode cathode material on the cathode side, such as one of (La.Sr.Ca)(Mn.Co.Ni)$O_3$.

In addition to inefficiencies at the electrolyte-air electrode interface in fuel cells with regard to electrochemical activity, three-phase boundary charge transfer, oxygen loss and deleterious reactions between the two components, new problems relating to output per cell have arisen when the fuel cell is run at low temperatures, in order to try to develop even more environmentally clean SOFC power generation. Current use of a single phase cerium oxide interlayer, at thicknesses up to 2 micrometers, (as taught in U.S. Pat. No. 5,106,706, discussed previously) does not appear to provide an optimized electrochemical reaction area. What is needed is a means to decrease the charge transfer polarization further and to improve performance over what is possible through use of a single phase cerium oxide interlayer.

SUMMARY OF THE INVENTION

Therefore, it is a main object of this invention to provide fuel cells having improved performance at lower operating temperatures. It is another object of this invention to provide fuel cells having a higher operating efficiency, reduced fuel consumption per unit of power generated, and reduced cost.

These and other objects of the invention are accomplished by providing a tubular, solid electrolyte electrochemical fuel cell which can operate at temperatures of about 800° C. to 1000° C. which comprises: a first tubular air electrode consisting essentially of a cerium and calcium doped $LaMnO_3$ material; a solid, tubular electrolyte consisting essentially of stabilized zirconia, disposed on a first portion of the air electrode; a tubular fuel electrode consisting essentially of a cermet material disposed on a portion of the solid electrolyte; and a tubular sintered discrete interlayer disposed between and contacting the electrolyte and air electrode, the interlayer consisting essentially of at least a two-phase mixture of 20 wt % to 80 wt % of a material selected from the group consisting of scandia stabilized zirconia particles, yttria stabilized zirconia particles, doped cerium oxide particles, and mixtures thereof, having a particle size in the range of 0.5 micrometer to 5 micrometers, and 20 wt % to 80 wt % of a material selected from the group consisting of doped lanthanum manganite particles, doped lanthanum chromite particles and platinum particles, having a particle size in the range of 1 micrometer to 5 micrometers, where at least 50% of the particles in the interlayer are less than 3 micrometers, the sintered interlayer having a thickness of 10 micrometers to 40 micrometers and a porosity between about 5% to 50%.

Preferably, the electrolyte is selected from yttria stabilized zirconia or scandia stabilized zirconia, deposited by either plasma arc spraying, or flame spraying. Voltage versus current density characteristics at the air electrode-electrolyte interface, at 800°, 900° and 1000° C., show a 5% to 10% improvement using the interlayer of this invention over state-of-the art single phase cerium oxide interfaces. The term "tubular" is herein defined as including common circular fuel cells with circular air electrodes, as well as the flattened circular design having internal ribs shown in FIG. 3, as well as other flattened and elongated oval designs discussed later. The first portion of the air electrode which the electrolyte is deposited, is that portion not to be covered by the interconnect material.

BRIEF DESCRIPTION OF THE DRAWINGS

The above and other advantages of this invention will be more apparent from the following description in view of the drawings, where.

DETAILED DESCRIPTION OF THE PREFERRED EMBODIMENTS

Figure 1:
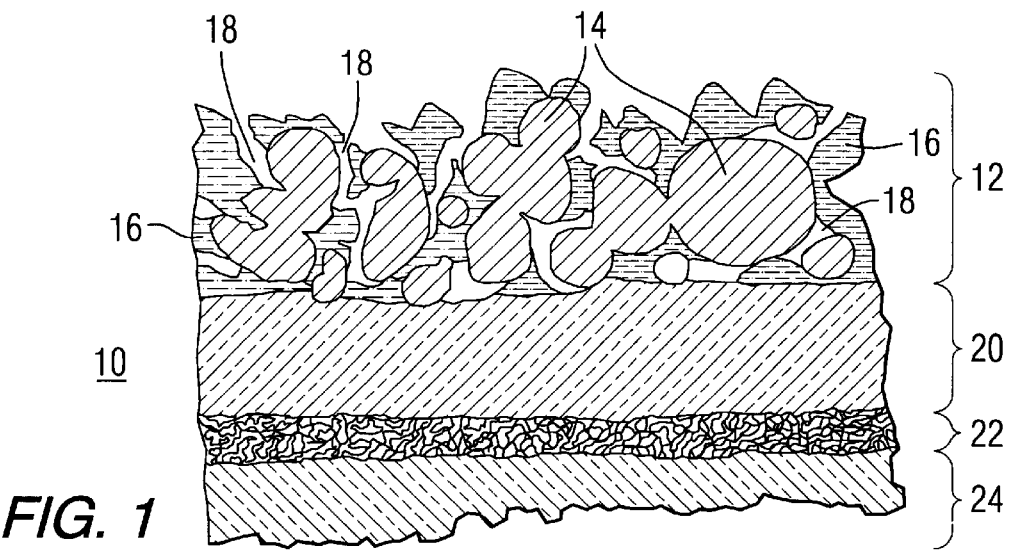
FIG. 1 is an idealized, magnified cross section of the interlayer of this invention disposed between a dense electrolyte and a porous air electrode.

Referring now to FIG. 1 of the drawings, an idealized cross-section of a fuel cell structure 10 is shown, with a portion of the top fuel electrode layer 12 containing Ni particles 14 in a skeleton extension 16 of dense electrolyte material, where pores 18 connect throughout the fuel electrode layer. The usually 100% dense, oxygen ion conducting electrolyte layer 20, usually made of stabilized zirconia, such as $(ZrO_2)_{0.9}(Y_2O_3)_{0.1}$ or $(ZrO_2)_{0.9}(ScO)_{0.1}$, about 30 micrometers to 100 micrometers thick, is deposited by electrochemical vapor deposition or, preferably, a thermal spraying technique (such as plasma arc spraying or flame spraying, both of which are well known techniques).

The electrolyte is deposited on top of a discrete interlayer 22, which contains at least a two-phase mixture of particles: phase (1) of 20 wt % to 80 wt % of at least one of scandia stabilized zirconia, yttria stabilized zirconia or doped cerium oxide ($CeO_2$), with the first two preferred and phase (2) of 20 wt % to 80 wt % of at least one of doped lanthanum manganite, doped lanthanum chromite or platinum, with the first two preferred. This interlayer 22 is from 10 micrometers to 50 micrometers thick (0.01 mm to 0.05 mm) with a porosity between about 5% to 50% (50% to 95% of theoretical density), preferably from 10% to 35% porous and with a thickness between 15 micrometers and 40 micrometers. Scandia stabilized zirconia (ScSZ) possesses a higher oxygen ion conductivity than YSZ, especially at temperatures lower than 1000° C. Thus, a SOFC comprising ScSZ electrolyte results in a lower cell ohmic resistance particularly at lower temperatures. The combination of the two-phase porous mixed conducting composite interlayer that reduces charge-transfer resistance at the air electrode-electrolyte interface and ScSZ electrolyte which decreases the cell ohmic resistance results in a very high performance SOFC, especially at lower temperatures.

Figure 2:
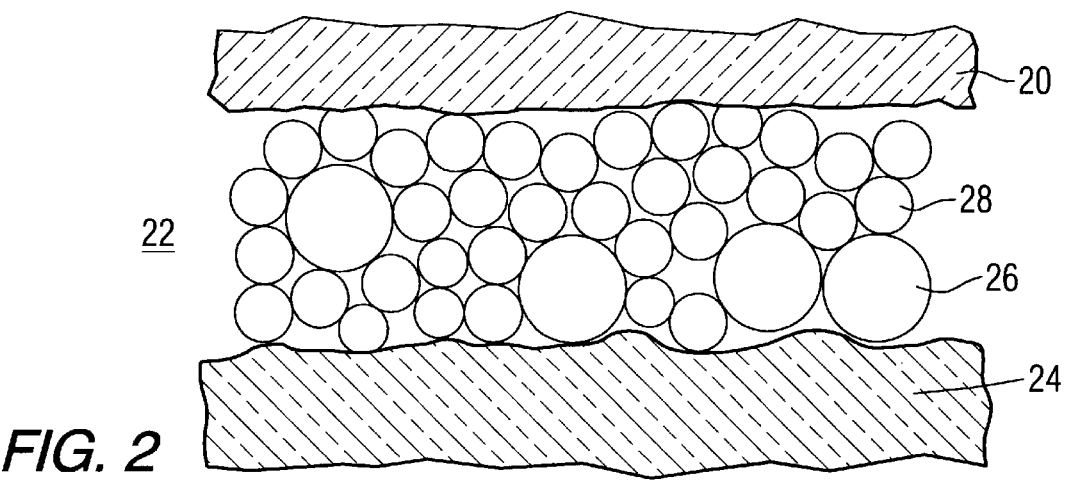
FIG. 2, which best shows the invention, is a further magnified view of the interlayer, prior to sintering, showing particle distributions.

The interlayer 22 will be disposed on porous ceramic air electrode 24 preferably by a dip coating process of an interlayer slurry of the dual particle mixture in an organic solvent such as isopropyl alcohol or terpeniol. Additives to the interlayer slurry can include an organic binder such as polyvinyl alcohol, to provide green strength to the thin coating, as well as dispersants such as polymethyl methacrylate, to allow a homogenous dispersion of generally contacting particles to get a smooth film with a uniform thickness, with minimum (less than 10%) agglomeration of particles, as shown in FIG. 2. The air electrode composition will consist essentially of a cerium and calcium doped $LaMnO_3$, as taught in U.S. Pat. Nos. 4,562,124 and 5,686,198, discussed previously. An example of a suitable air electrode material, useful in a tubular solid oxide fuel cell operating at from 800° C. to 1000° C. would be: $La_{1-x-w}(Ca)_x(Ce)_wMnO_3$, more generally $La_{1-x-w-y}(Ca)_x(Ce)_w(Ln)_yMn_{1-z}(M)_2O_3$, where Ln is selected from at least one of Pr, Nd, Sm, Eu, Gd, Dy, Er Y and Yb; M is selected from at least one of Ni, Cr, Fe, Co, Al, In, Sn, and Mg; where small amounts of Sr and/or Ba can substitute for some Ca, w is from 0.1 to 0.2, x is from 0.2 to about 0.55, y is from 0 to about 0.5, and z is from 0 to about 0.3. The air electrode is usually self-supporting, 50% to 95% porous and about 0.5 mm to 2 mm thick.

Figure 3:
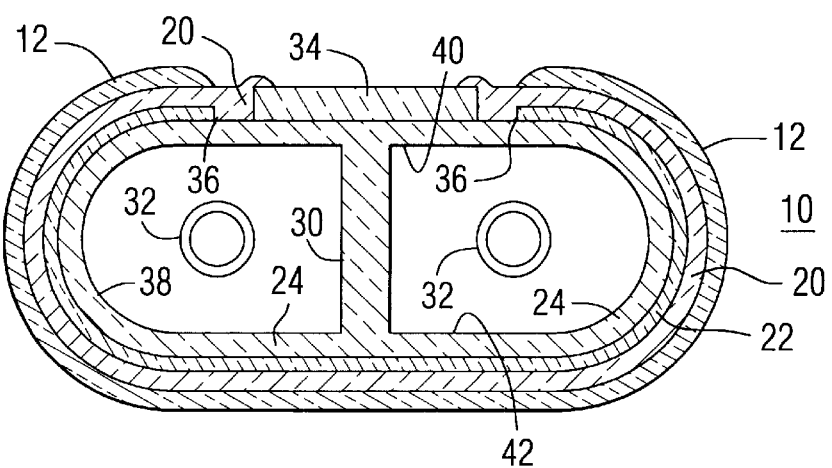
FIG. 3 is a section through one embodiment of an oval or flatted circular ribbed type of fuel cell useful in this invention.

For even higher performance, a ribbed, flattened circular fuel cell air electrode design can be used, as described in the Reichner U.S. Pat. No. 4,888,254, and shown in FIG. 3 of this application, as well as the flattened, elongated, oval design described in the Reichner U.S. Pat. No. 4,874,678, all of which are herein defined as being included and covered by the term "tubular" as used herein. Thus, the fuel cell and all its "components": air electrode, interlayer, electrolyte, fuel electrode etc., can have these designs/configurations. FIG. 3 shows the fuel cell 10, comprising air electrode 24, electrolyte 20, interlayer 22, fuel electrode 12, interior air electrode rib(s) 30, oxidant inlet feed tubes 32, and interconnect 34 used for electrical cell connection. When applying the interlayer to the air electrode, the interconnect area will be masked between points 36, so that the interlayer 22 does not contact the interconnect 34. The sides of the rib(s) 30 need not be straight as shown in FIG. 3 but can have a curved surface, as shown at 38 and illustrated in both Reichner U.S Pat. Nos. 4,888,254 and 4,874,678, so that the term "internal rib" is meant to include any geometry that connects top 40 to bottom 42 air electrode interior surfaces. These ribbed cells provide a low circumferential voltage gradient and a high power density.

FIG. 2 shows an idealized portion of the interlayer 22 showing a possible particle size distribution before sintering. The interlayer will always be at least a dual phase system containing a combination of 20 wt % to 80 wt % of at least one type of electrolyte, preferably 8% to 10% yttria stabilized zirconia, with 20 wt % to 80 wt % of at least one type of electrode particles, preferably a doped lanthanum manganite. In order to insure proper surface area to promote electrochemical activity, at least 50 wt % of the particles in the interlayer are less than 3 micrometers diameter. Thus, in FIG. 2 the large particles 26 could represent 30 wt % yttria stabilized zirconia particles having diameters of about 4 micrometers, and the small particles 28 could represent 70 wt % doped lanthanum manganite particles having diameters of about 2 micrometers, to provide a two-phase mixture. Within the interlayer of this invention, if the particle sizes are less than 0.5 micrometer, problems relating to microstructure stability will occur as well as many pores of the air electrode will be closed. At particle sizes greater than 5 micrometers, the net effect will be to reduce performance since total surface area within the interlayer is reduced.

EXAMPLE

A tubular sintered porous air electrode closed on one end and made of Ca and Ce doped lanthanum manganite, with a plasma sprayed and densified interconnection strip made of doped lanthanum chromite served as the starting point. Over this air electrode substrate, a mixture containing 50% by weight of doped lanthanum manganite and 50% by weight of yttria stabilized zirconia (YSZ) was applied by means of a dip coating process. During the coating process, the interconnection strip was masked to prevent application over the interconnection. The mixture was first made into a homogenous slurry (or suspension) by dispersing it and mixing it in an organic solvent such as terpeniol also containing an organic binder such as polyvinyl alcohol to provide green strength to the resulting coating.

The green interlayer coating of the mixture of doped lanthanum manganite and YSZ was then subjected to a heat treatment between 1000° C. and 1200° C. to create a physical/chemical bond between the air electrode substrate and the coating. This high temperature step also imparts strength to the layer of the mixture of doped lanthanum manganite and YSZ. The thickness of the heat treated interlayer was about 20 micrometers and the grain size of the particles of doped lanthanum manganite and YSZ in the sintered interlayer was bout 1 to 5 micrometers, with no more than 50% total over 3 micrometers. The interlayer had sufficient porosity (about 20%) to allow gas transport.

Then the electrolyte, which was made of fully stabilized zirconia (10 mol % YSZ), was applied to the air electrode-interlayer assembly by electrochemical vapor deposition (EVD). The electrolyte was a substantially dense layer about 40 micrometers in thickness. As a final step, the fuel electrode, which was a nickel-YSZ cermet material, was applied over the air electrode-interlayer-electrolyte assembly by cermet EVD. A state-of-the-art test fuel cell electrode was made the same way except that a thin $CeO_2$ interlayer was infiltrated into the air electrode as a substitute for the interlayer described above.

Figure 4:
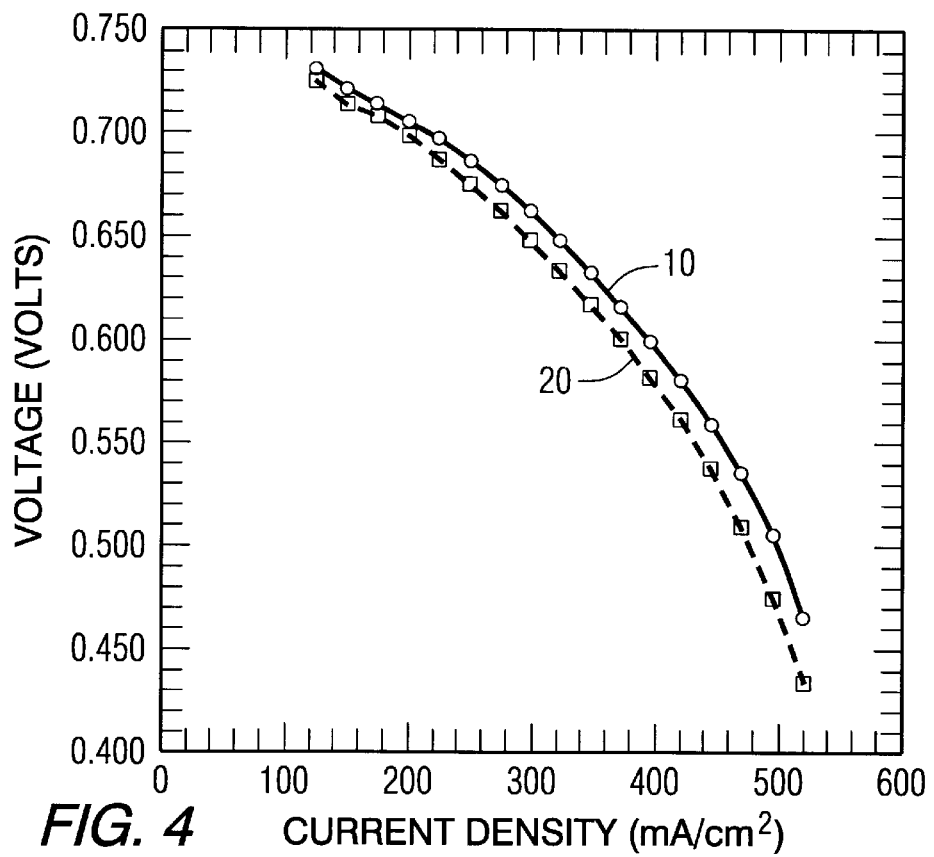
FIG. 4 shows comparative voltage-current density curves at 1000° C.
Figure 5:
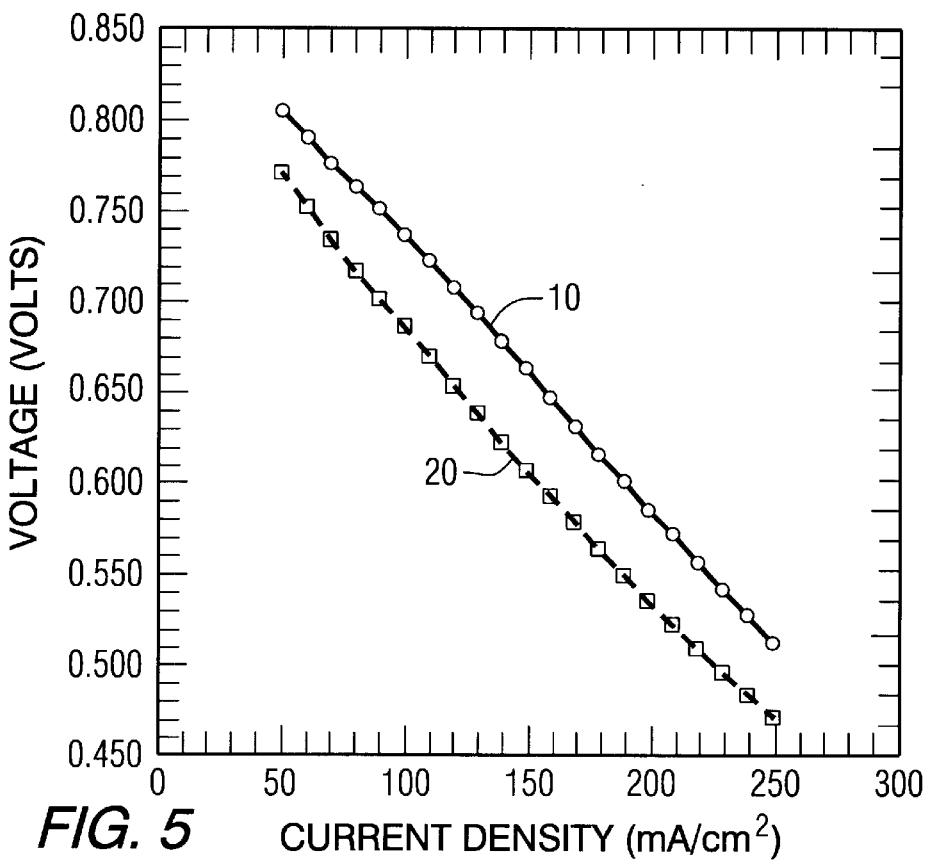
FIG. 5 shows comparative voltage-current density curves at 800° C.
Figure 6:
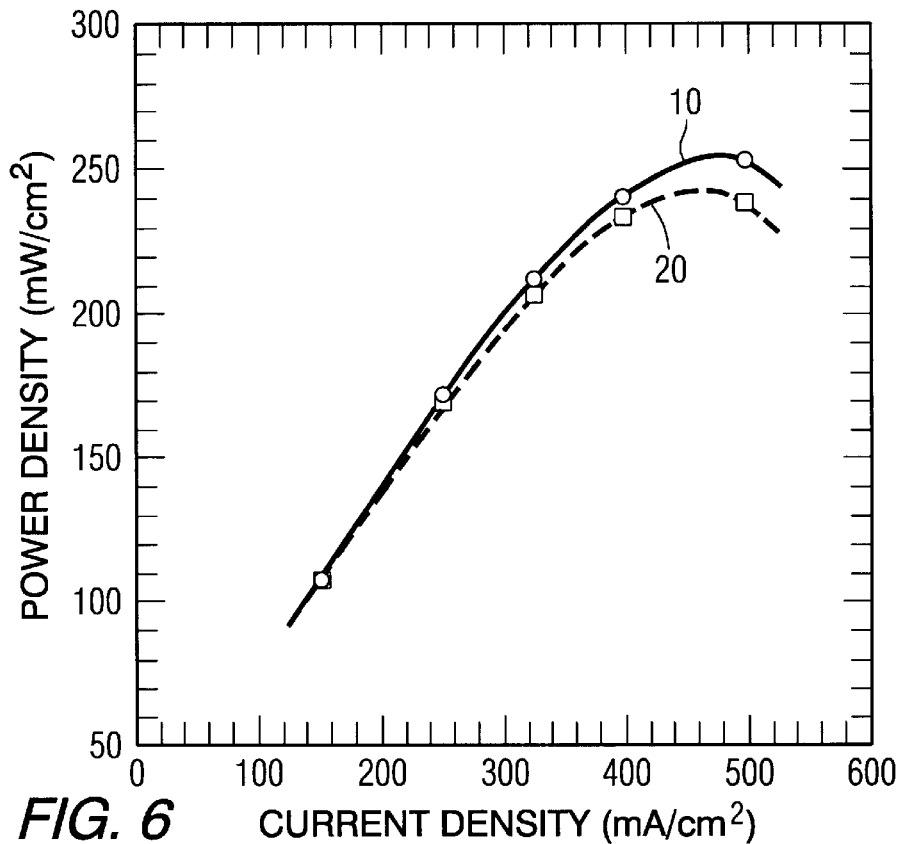
FIG. 6 shows comparative power density-current density curves at 1000°.
Figure 7:
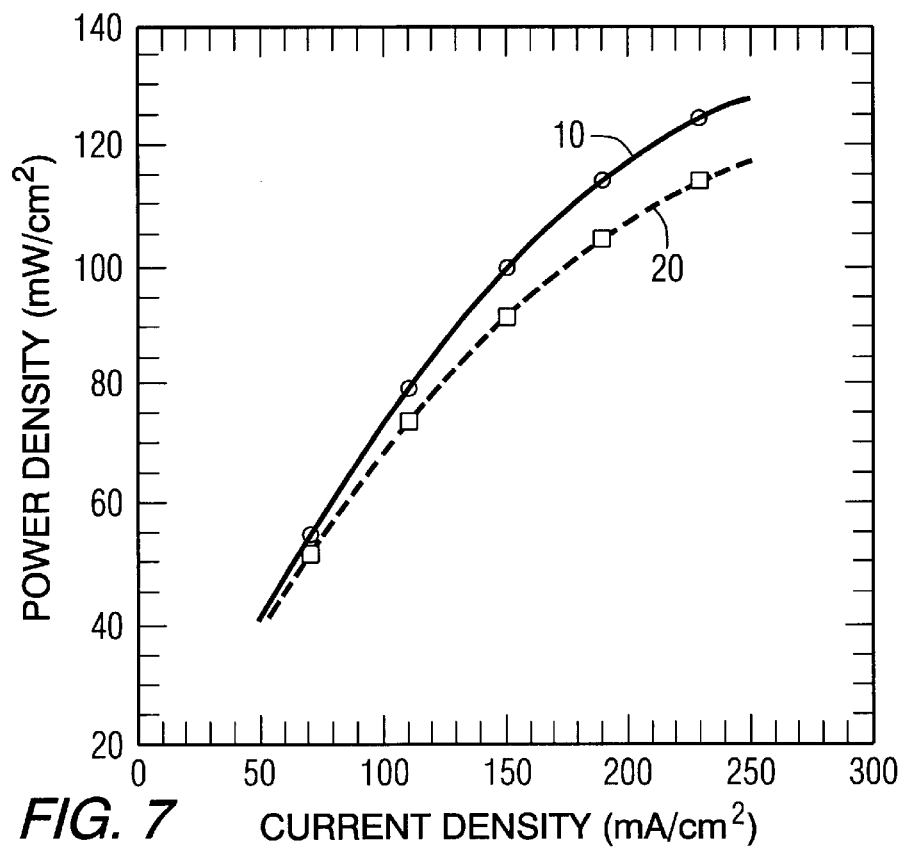
FIG. 7 shows comparative power density-current density curves at 800°.

Voltage-current density characteristics and power density-current density characteristics were obtained from the cylindrical SOFCs fabricated in the manner outlined above and are shown in FIGS. 4 and 6 at 1000° C. and 5 and 7 at 800° C. Data obtained from a cell with "standard" vacuum infiltrated cerium oxide, which represents a state-of-the-art SOFC are also shown in the Figures.

As can be seen in FIGS. 4–7, the performance of a tubular SOFC with the interlayer of this invention, curves 10 in each of FIGS. 4–7, improves performance by 5% to 10%, especially at the lower temperature of 800° C. over the single phase $CeO_2$ interlayer of the prior art, shown as curves 20 in each of FIGS. 4–7.

The electrolyte can also be applied by plasma spraying, to lower costs compared to electrochemical vapor deposition. For plasma spraying, an 8 mol % yttria stabilized zirconia (8 YSZ) or a 10 mol % scandia doped zirconia (10 ScSZ) electrolyte, in the thickness range of 30 to 60 micrometers, a Praxair thermal spray unit model #3620 and a spray gun model # SG-100 were used. The air electrode substrate with the interlayer deposited as described above was held in a rotating fixture in a vertical position. The rotating fixture was controlled by a stepper motor which rotated the air electrode substrate in fixed angular increments while the spray gun traveled the length of the substrate. The following spray parameters were used:

Spray power: 28 to 40 kW
Arc gas (Ar) pressure: 35 to 80 psi
Arc gas flow rate: 25 to 60 SLPM*
Auxiliary gas ($H_2$) pressure: 20 to 180 psi
Auxiliary gas flow rate: 0.3 to 3 SLPM*
Powder gas (Ar) pressure: 10 to 20 psi
Powder gas flow rate: 2 to 6 SLPM*
Powder feed rate: 5 to 15 g/min
Spray distance: 2 to 3.5"
No. of spray passes: 100 to 200
(standard liters per minute)

A post plasma spray heat treatment was applied to the cell to produce substantially a gas tight electrolyte film. This heat treatment was in the temperature range of 1000° C. to 1500° C. for a period of 1 to 20 hours.

The present invention may be embodied in other forms without departing from the spirit or essential attributes thereof, and accordingly, reference should be made to both the appended claims, and to the foregoing specification as indicting the scope of the invention.

What is claimed is:

1. A tubular, solid electrolyte electrochemical fuel cell which can operate at temperatures of about 800° C. to 1000° C. which comprises:

a first tubular air electrode consisting essentially of a cerium and calcium doped $LaMnO_3$ material;

a solid, tubular electrolyte consisting essentially of stabilized zirconia, disposed on a first portion of the air electrode;

a tubular fuel electrode consisting essentially of a cermet material disposed on a portion of the solid electrolyte; and a tubular sintered discrete interlayer disposed between and contacting the electrolyte and air electrode, the interlayer consisting essentially of at least a two-phase mixture of:

(1) 20 wt. % to 80 wt. % of a material selected from the group consisting of scandia stabilized zirconia particles, yttria stabilized zirconia particles, doped cerium oxide particles, and mixtures thereof, having a particle size in the range of 0.5 micrometer to 5 micrometers; and (2) 20 wt. % to 80 wt. % of a material selected from the group consisting of doped lanthanum manganite particles, doped lanthanum chromite particles and platinum particles, having a particle size in the range of 1 micrometer to 5 micrometers; where at least 50 wt. % of the particles in the interlayer are less than 3 micrometers, and the sintered interlayer has a thickness of 15 micrometers to 40 micrometers and a porosity between about 5% to 50%.

2. The fuel cell of claim 1, wherein the electrolyte is selected from yttria stabilized zirconia and scandia stabilized zirconia.

3. The fuel cell of claim 1, wherein the interlayer has a porosity of from 10% to 35%.

4. The fuel cell of claim 1, wherein the air electrode is selected from a material having the composition $La_{1-x-w}(Ca)_x(Ce)_wMnO_3$, where x=0.2 to about 0.55 and w=0.1 to 0.2.

5. The fuel cell of claim 1, wherein the phase (2) particles are selected from the group consisting of doped-lanthanum manganite, doped lanthanum chromite and mixtures thereof.

6. The fuel cell of claim 1, where the interlayer contains generally contacting particles.

7. The fuel cell of claim 1, where the interlayer has a uniform thickness with minimum agglomeration of particles.

8. The fuel cell of claim 1, where the tubular fuel cell and components have a flattened circular design with interior air electrode ribs.

9. The fuel cell of claim 1, where the tubular fuel cell and components have a flattened, elongated oval design with interior air electrode ribs.

* * * * *